United States Patent [19]

Carr et al.

[11] Patent Number: 5,512,603
[45] Date of Patent: Apr. 30, 1996

[54] HYDROXY AND AMINO FUNCTIONAL PYRROLIZIDINE CATALYST COMPOSITIONS FOR THE PRODUCTION OF POLYURETHANES

[75] Inventors: Richard V. C. Carr; Kevin R. Lassila, both of Allentown; Mark L. Listemann, Whitehall; Lisa A. Mercando, Pennsburg; Kristen E. Minnich, Allentown; Ann C. L. Savoca, Bernville; Amy L. Wressell, Allentown, all of Pa.

[73] Assignee: Air Products and Chemicals, Inc., Allentown, Pa.

[21] Appl. No.: 199,396

[22] Filed: Feb. 22, 1994

[51] Int. Cl.⁶ .............................. C08J 9/04; C08G 18/20; C08G 18/30; C08G 18/32; C07D 251/34; C07C 269/02; C07C 273/02

[52] U.S. Cl. .......................... 521/118; 521/129; 521/163; 521/166; 521/902; 528/54; 528/49; 528/73; 528/74; 528/85; 544/193; 544/222; 560/24; 560/25; 560/26; 560/115; 560/157; 560/158; 560/330; 560/355; 560/358; 564/32

[58] Field of Search ................................. 521/118, 129, 521/163, 166, 902; 528/54, 73, 74, 85, 49; 544/193, 222; 560/24, 25, 26, 115, 157, 158, 330, 355, 358; 564/32

[56] References Cited

U.S. PATENT DOCUMENTS

| | | |
|---|---|---|
| 3,970,600 | 7/1976 | Falkenstein et al. ............... 528/53 |
| 4,066,580 | 1/1978 | Falkenstein et al. ............... 521/130 |
| 4,085,140 | 4/1978 | Ibbotson ............................. 540/202 |
| 4,388,238 | 6/1983 | Heitkämper et al. .............. 544/164 |
| 4,430,505 | 2/1984 | Heitkämper et al. .............. 560/24 |
| 4,480,110 | 10/1984 | Heitkämper et al. .............. 549/467 |
| 4,593,117 | 6/1986 | Knöfel et al. ...................... 560/115 |
| 4,957,944 | 9/1990 | Schiffauer et al. ................ 521/115 |
| 5,071,809 | 12/1991 | Casey et al. ....................... 502/155 |
| 5,091,583 | 2/1992 | Casey et al. ....................... 564/461 |
| 5,143,944 | 9/1992 | Savoca et al. ..................... 521/129 |
| 5,274,114 | 12/1993 | Weider et al. ..................... 548/453 |

FOREIGN PATENT DOCUMENTS

| | | |
|---|---|---|
| 2061168 | 8/1992 | Canada . |
| 2040607 | 3/1971 | Germany . |

Primary Examiner—James J. Seidleck
Assistant Examiner—Rabon Sergent
Attorney, Agent, or Firm—Michael Leach; William F. Marsh

[57] ABSTRACT

A method for preparing a polyurethane foam which comprises reacting an organic polyisocyanate and a polyol in the presence of a blowing agent, cell stabilizer and a catalyst composition consisting essentially of a pyrrolizidine of the formula:

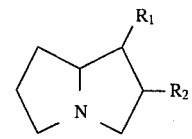

where
$R_1$ and $R_2$ independently are —H, —OH,

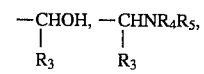

or —$NR_4R_5$,
$R_3$ is hydrogen, a $C_1$–$C_{12}$ alkyl, $C_5$–$C_6$ cycloalkyl, $C_6$–$C_{10}$ aryl, or $C_7$–$C_{11}$ arylalkyl group, and
$R_4$ and $R_5$ independently represent H, a $C_1$–$C_{12}$ alkyl group, $C_5$–$C_{10}$ cycloalkyl, $C_6$–$C_{10}$ aryl, or $C_7$–$C_{11}$ arylalkyl group, provided that at least $R_1$ or $R_2$ is not hydrogen.

20 Claims, No Drawings

HYDROXY AND AMINO FUNCTIONAL PYRROLIZIDINE CATALYST COMPOSITIONS FOR THE PRODUCTION OF POLYURETHANES

TECHNICAL FIELD

The present invention relates to the use of functional tertiary amines as catalysts for producing polyurethanes.

BACKGROUND OF THE INVENTION

Polyurethane foams are widely known and used in automotive, housing and other industries. Foam is generally referred to as rigid, microcellular or flexible. Typically, in the preparation of polyurethane foams, a tertiary amine catalyst is used to accelerate the reaction of the polyisocyanate with water to generate carbon dioxide as a blowing agent and to accelerate the reaction of polyisocyanate with polyols to promote gelling. Tertiary amines generally are malodorous and offensive and many have high volatility due to low molecular weight. Release of tertiary amines during foam processing may present significant safety and toxicity problems, and release of residual amines from consumer products is generally undesirable.

Amine catalysts which contain primary and/or secondary hydroxyl functionality typically have limited volatility and low odor when compared to related structures which lack this functionality. Furthermore, catalysts which contain hydroxyl functionality chemically bond into the urethane during the reaction and are not released from the finished product. Catalyst structures which embody this concept are typically of low to moderate activity and, typically, more favorably promote the blowing (water-isocyanate) reaction over the gelling (polyol-isocyanate) reaction. Examples of such structures are included in U.S. Pat. Nos. 4,957,944; 5,071,809 and 5,091,583.

Prior art examples of hydroxy functional tertiary amine catalysts which have selectivity for the gelling (polyol-isocyanate) reaction over the blowing (water-isocyanate) reaction are difficult to find. U.S. Pat. No. 5,143,944 discloses 3-quinuclidinol (3-hydroxyazabicyclo[2.2.2]octane) and its alkoxylated derivatives as catalysts which are selective for the gelling reaction.

Although pyrrolizidines are known to be catalysts for the production of polyurethane foams, they are primarily used as blowing catalysts.

DE 2,040,607 discloses pyrrolizidine (1-azabicyclo[3.3.0]octane) as a polyurethane foaming catalyst which does not influence gelation.

CA 2,061,168 A discloses the preparation and use of substituted pyrrolizidines as polyurethane foaming catalysts. Preparative examples include pyrrolizidines substituted or disubstituted at the 3- and 4-position either with an electron withdrawing group such as cyano or butyl ester or alternatively with aminomethyl functionality.

SUMMARY OF THE INVENTION

The present invention provides a composition for catalyzing the trimerization of an isocyanate and/or the reaction between an isocyanate and a compound containing a reactive hydrogen, e.g., the blowing reaction and the urethane reaction for making polyurethane. The catalyst composition consists essentially of a pyrrolizidine of the following formula:

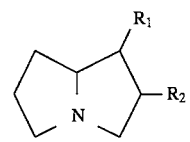

where $R_1$ and $R_2$ independently are —H, —OH,

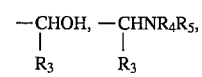

or —$NR_4R_5$, $R_3$ is hydrogen, a $C_1$–$C_{12}$ alkyl, $C_5$–$C_6$ cycloalkyl, $C_6$–$C_{10}$ aryl, or $C_7$–$C_{11}$ arylalkyl group, and $R_4$ and $R_5$ independently are hydrogen, a $C_1$–$C_{12}$ alkyl group, $C_5$–$C_6$ cycloalkyl, $C_6$–$C_{10}$ aryl, or $C_7$–$C_{11}$ arylalkyl group, provided that at least one of $R_1$ and $R_2$ is not hydrogen.

These catalyst compositions advantageously afford a significant improvement in reactivity during the production of a polyurethane over exemplary pyrrolizidines in the prior art. Most notably, these catalyst compositions are selective for the gelling reaction. They are low odor and preferably non-fugitive.

DETAILED DESCRIPTION OF THE INVENTION

The catalyst compositions according to the invention can catalyze (1) the reaction between an isocyanate functionality and an active hydrogen-containing compound, i.e. an alcohol, a polyol, an amine or water, especially the urethane (gelling) reaction of polyol hydroxyls with polyisocyanate to make polyurethanes and the blowing reaction of water with polyisocyanate to release carbon dioxide for making foamed polyurethanes, and/or (2) the trimerization of the isocyanate functionality to form polyisocyanurates.

The polyurethane products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipit acid with ethylene glycol or butanediol, or reacting a lactone with an excess of a diol such as caprolactone with propylene glycol.

In addition to the polyether and polyester polyols, the master-batches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols when present may comprise 20–80% of the polyol portion of the masterbatch.

Other typical agents found in the polyurethane foam formulations include chain extenders such as ethylene glycol and butanediol; cross-linkers such as diethanolamine, diisopropanolamine, triethanolamine and tripropanolamine; blowing agents such as water, methylene chloride, trichlorofluoromethane, and the like; and cell stabilizers such as silicone surfactants.

A general polyurethane flexible foam formulation containing the catalyst composition according to the invention would comprise the following components in parts by weight (pbw):

| Flexible Foam Formulation | |
|---|---|
| | pbw |
| Polyol | 20–100 |
| Polymer Polyol | 80–0 |
| Silicone Surfactant | 1–2.5 |
| Blowing Agent | 2–4.5 |
| Crosslinker | 0.5–2 |
| Catalyst | 0.5–2 |
| Isocyanate Index 70-115 | |

The catalyst composition of the invention consists essentially of a pyrrolizidine of the following formula:

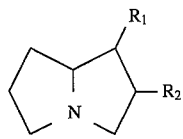

where $R_1$ and $R_2$ independently are —H, —OH,

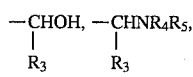

or —$NR_4R_5$, $R_3$ is hydrogen, a $C_1$–$C_{12}$ alkyl, $C_5$–$C_6$ cycloalkyl, $C_6$–$C_{10}$ aryl, or $C_7$–$C_{11}$ arylalkyl group, which cycloalkyl, aryl, or arylalkyl group may also contain a $C_1$–$C_8$ alkyl substituent, and $R_4$ and $R_5$ independently are hydrogen, a $C_1$–$C_{12}$ alkyl group, $C_5$–$C_6$ cycloalkyl, $C_6$–$C_{10}$ aryl, or $C_7$–$C_{11}$ arylalkyl group, which cycloalkyl, aryl, or arylalkyl group may also contain a $C_1$–$C_8$ alkyl substituent, provided that at least one of $R_1$ and $R_2$ is not hydrogen.

Alkyl groups $R_3$, $R_4$, and $R_5$ would include, for example, methyl, ethyl, propyl, butyl, octyl and the like; cycloalkyl would include, for example, cyclopentyl and cyclohexyl; aryl groups would include, for example, phenyl, naphthyl, p-tolyl and the like; and arylalkyl would include, for example phenylmethyl and phenylethyl and the like.

When $R_1$ and $R_2$ are not identical, the compounds may be mixtures of different isomers with respect to the position of the substituents $R_1$ and $R_2$ in the 3- or 4-position of the pyrrolizidine, different stereoisomers or isomer pure compounds.

Pyrrolizidines of the above formula in which $R_1$ and $R_2$ are independently —H, —CH($R_3$)OH, —CH($R_3$)$NR_4R_5$, or —$NR_4R_5$ can be prepared via a one or two step reduction of products of the dipolar cycloaddition of proline, formaldehyde and an activated olefin as outlined in CA 2,061,168 A. For pyrrolizidines with —CH($R_3$)OH substitution, the cycloaddition product from proline, formaldehyde and an acrylate would be reduced with for example, hydrogen, metal hydrides or alkyl metals. The amino substituted pyrrolizidines, $R_1$ or $R_2$=CH($R_3$)$NR_4R_5$, are available via reductive amination of cycloaddition products from proline, formaldehyde and acrylonitrile. Amino substituted pyrrolizidines, $R_1$ or $R_2$=$NR_4R_5$ are available via reduction of the cycloaddition product from proline, formaldehyde and nitroethylene. 4-Hydroxymethylpyrrolizidine ($R_1$=$CH_2OH$) can be prepared by an alternative procedure involving the acid mediated cyclization of bis(4,4-dimethoxybutyl)amine. 4-Hydroxypyrrolizidine ($R_1$=OH) can be prepared in three steps from pyrrole.

A catalytically effective amount of the catalyst composition is used in the polyurethane formulation. More specifically, suitable amounts of the catalyst composition may range from about 0.01 to 10 wt parts per 100 wt parts polyol (phpp) in the polyurethane formulation.

The catalyst composition may be used in combination with other tertiary amine, organotin and/or carboxylate urethane catalysts well known in the urethane art.

The catalyst compositions have the advantage of significantly improved reactivity during the production of a polyurethane in comparison with exemplary pyrrolizidines in the prior art and comparable or improved reactivity over industry standard catalysts such as triethylenediamine [TEDA]. Most notably, these catalysts are selective for the gelling reaction. They are low odor and preferably non-fugitive.

EXAMPLE 1

Several pyrrolizidines were prepared according to the procedures outlined in Canadian patent application CA 2,061,168 A. Table 1 sets forth the pyrrolizidines 1a, 1b and 1c.

TABLE 1

![structure with R1 and R2 on pyrrolizidine]

|  | Structure | Yield |
| --- | --- | --- |
| Example 1a | mixture of $R_1 = H, R_2 = CN$ and $R_1 = CN, R_2 = H$ | 42% |
| Example 1b | mixture of $R_1 = H, R_2 = CO_2Bu$ and $R_1 = CO_2Bu, R_2 = H$ | 74% |
| Example 1c | $R_1$ and $R_2 = CO_2Et$ | 44% |

EXAMPLE 2

This example shows the synthesis of a mixture of 3- and 4-hydroxymethylpyrrolizidine from Example 1b product. To 20 mL of anhydrous tetrahydrofuran was added 13.1 g (0.062 mole) of Example 1b product, followed by 0.88 g (1.5 equivalents) of lithium aluminum hydride. The mixture was stirred for 3 hr at ambient temperature. Concentrated sulfuric acid was then added dropwise to destroy excess reducing reagent. The mixture was poured into 200 mL of 25 wt % aqueous sodium hydroxide, which was saturated with sodium chloride and extracted with ether. The ether extract was concentrated in vacuo to give 1.5 g of a mixture of 3- and 4-hydroxymethylpyrrolizidine.

EXAMPLE 3

This example shows the synthesis of a mixture of 3- and 4-(N-isopropyl)aminomethylpyrrolizidine from Example 1a product. Into a 1 L stainless steel autoclave was placed 4.5 g of Example 1a product, 50 mL of tetrahydrofuran, 50.8 g of isopropylamine, and 1.0 g of 5 wt % palladium on carbon. The temperature of the reaction mass was raised to 90° C. and the pressure raised to 800 psig (5515 kPa) with hydrogen. After 20 hr at temperature and pressure, the contents were cooled and the autoclave was vented. The solvent and excess isopropylamine were removed in vacuo and the crude product distilled at 80° C. and 2 torr (0.267 kPa) to give 2.5 g of a mixture of 3- and 4-(N-isopropyl)aminomethylpyrrolizidine.

EXAMPLE 4

This example shows the synthesis of 4-hydroxymethylpyrrolizidine. A 250 mL round-bottomed flask was charged with 88% formic acid (102 g, 2.2 mole). Bis(4,4-dimethoxybutyl)amine was added dropwise at room temperature over a period of 1 hr. The resulting red solution was stirred under nitrogen at room temperature overnight and then added slowly over 60 rain to saturated aqueous NaOH (200 mL) cooled in an ice bath. A layer of oil separated and was extracted into ether (3×200 mL). The combined ether layers were dried over $MgSO_4$ and the ether was evaporated to afford 23 g of crude aldehyde estimated to be 47% aldehyde (GC analysis). The crude aldehyde (10.02 g) was dissolved in tetrahydrofuran (20 mL) and added dropwise over 60 min to a flask containing $NaBH_4$ (2.73 g, 2.73 mole) suspended in ethanol (27 mL). The reaction mixture was stirred an additional hour and then concentrated HCl (16 mL) was added to decompose the hydride. After stirring for 5 min, 6M NaOH was added until the pH of the reaction mixture was 12–14. The product was extracted into ether (3×100 mL), the combined ether layers were dried over $MgSO_4$, and the solvent was removed by rotary evaporation. Short path distillation afforded 1.5 g of 4-hydroxymethylpyrrolizidine of 90% purity (GC/MS, NMR).

EXAMPLE 5

This example shows the synthesis of 4-hydroxypyrrolidine. A 500 mL flask equipped with an addition funnel, reflux condenser, nitrogen inlet, and magnetic stirrer was charged with pyrrole (116 g) and benzyltrimethylammonium hydroxide (Triton B, 11.6 mL). Acrylonitrile (116 mL) was added over a period of about 1 hr by means of an addition funnel, keeping the temperature below 40° C. with an ice bath. The solution was warmed to room temperature and stirred for an additional hour. A solution of KOH (116 g) in approximately 150 mL of water was prepared and added to the reaction solution. The resulting two-phase mixture was heated to reflux; after 1 hr at reflux, the mixture had become homogeneous and it was cooled to room temperature. Concentrated HCl (~50 mL) was added to neutralize the base and the product was extracted into 2×300 mL of ethyl ether. The nearly colorless ether solution was dried over magnesium sulfate and the solvent was removed by rotary evaporation. Kugelrohr distillation afforded 92.1 g of colorless oil, 3-pyrrolylpropionic acid 1 which solidified upon standing.

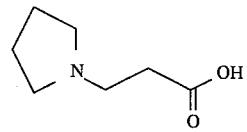

1

The 3-pyrrolylpropionic acid (4.0 g) was placed in 100 g of polyphosphoric acid and heated with vigorous stirring. The temperature was maintained at 100° C. for an hour. The solution turned from clear to black color and was then cooled to room temperature. Diethyl ether was added to the solution and stirred vigorously. The ether was pipetted off the top, dried over potassium carbonate, and rotovapped to dryness to afford crude ketone 2.

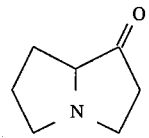

2

A 150 mL Parr autoclave was charged with 2 (1.95 g), HOAc (~60 mL), and 5% Rh—$Al_2O_3$ (0.43 g). Hydrogenation was carried out at 77° C. and 500 psig (3447 kPa). After 14 hr, gas uptake had ceased and the reaction mixture was cooled to room temperature. The catalyst was removed by filtration through Celite filter aid and the solvent was removed by rotary evaporation. GC/MS analysis of the product showed that it was composed of about 97% 4-hydroxyazabicyclo[3.3.0]octane isomers in a ratio of 89.5:7.7 (GC FID area %). The product 3 was purified by Kugelrohr distillation (~80° C., 2.0 mm Hg).

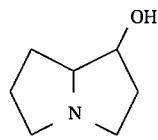

3

EXAMPLE 6

This example shows the synthesis of a mixture of 3- and 4-aminomethylpyrrolizidine from Example 1a product. Into a 1 L stainless steel autoclave was placed 5 g of chromium promoted Raney® nickel, 150 mL of methanol, and 13 g of anhydrous ammonia. The autoclave was heated to 80° C. and the pressure adjusted to 1200 psig (8274 kPa) with hydrogen. Through the use of a high pressure LC pump, 10.0 g of Example 1a product dissolved in 50 mL of methanol was admitted to the autoclave over a period of 2 hr. The reaction was allowed to proceed an additional 1.3 hr. The reactor contents were then cooled and the autoclave vented. The solvent was removed in vacuo and the crude product distilled at 68° C. and 2.2 torr (0.29 kPa) to give 8.4 g of a mixture of 3- and 4-aminomethylpyrrolizidine.

EXAMPLE 7

This example compares the relative molar activity of several pyrrolizidines with triethylenediamine (TEDA) in a standard TDI based, automotive seating formulation. DABCO® BL-11 catalyst ([70 wt %, bisdimethylaminoethyl ether in dipropylene glycol) as specified below was used as a co-catalyst for the blowing reaction. A polyurethane foam formulation premix was prepared from the following:

| FORMULATION | |
| --- | --- |
| E-648 (EO-tipped polyether polyol)* | 60 pphp |
| E-519 (SAN filled EO-tipped polyether polyol)* | 40 pphp |
| DABCO DC-5043 (silicone surfactant)** | 1.0 pphp |
| DEOA-LF (85% diethanolamine in water) | 1.75 pphp |
| Water | 3.24 pphp |
| DABCO BL-11** | 0.15 pphp |

*marketed by Arco Chemical Co.
**marketed by Air Products and Chemicals, Inc.

For each foam, catalysts were added to 40.7 g of above premix in the amounts specified in Table 2 (catalyst loading levels were based on 5.89×10$^{-4}$ mole gelling catalyst per foam diluted with 0.13 g of dipropylene glycol) and the formulation was mixed well in a 32 oz (946 mL) paper cup for 20 sec. Sufficient toluene diisocyanate (18.0 g of an 80/20 mixture of 2,4-TDI and 2,6-TDI) was added to make a 105 index foam (index=mole NCO/mole active hydrogen× 100) and mixed well for 4 sec. The foam was allowed to rise freely. Time measurements were recorded as:

Time 0—introduction of the isocyanate into the resin blend,

Top of Cup—top of the foam reached the top of the cup,

String Gel—time at which touching the top of the foam with a tongue depressor and lifting resulted in strings of product, Rise—foam reached its full height, Initial Height—height of the foam at its full rise, Finished Height—height of the foam after at least 15 hr.

Times were measured using a hand-held stopwatch; heights were measured using a digital micrometer.

TABLE 2

| Catalyst | Amount | Top of Cup | String Gel | Rise | Initial Heigth | Final Heigth |
| --- | --- | --- | --- | --- | --- | --- |
| DABCO 33-LV | 0.20 g | 22.4 sec | 47.3 sec | 74.5 sec | 195.9 mm | 171.6 mm |
| Example 1b | 0.12 g | 20.5 sec | 52.6 sec | 79.1 sec | 197.6 mm | 167.1 mm |
| Example 1c | 0.15 g | 37.5 sec | 77.4 sec | >150 sec | 185.9 mm | collapsed |
| Example 2 | 0.08 g | 17.2 sec | 31.3 sec | 68.0 sec | 210.4 mm | 176.3 mm |
| Example 3 | 0.11 g | 18.7 sec | 42.2 sec | 70.9 sec | 209.0 mm | 171.8 mm |
| Example 5 | 0.07 g | 20.2 sec | 48.8 sec | 88.2 sec | 201.9 mm | 167.7 mm |

Some obvious conclusions can be drawn from these data. Example 1c catalyst was much less active than TEDA. Example 1b catalyst was comparable to TEDA in activity. Example 5 catalyst was also comparable in activity to TEDA under the conditions of this example. Examples 2 and 3 catalysts were unexpectedly more active than TEDA.

EXAMPLE 8

A more general and quantitative technique for measuring catalyst activity is given in this example. Here, the relative catalytic activity of Examples 1a–1c, Example 2, and Example 3 catalysts were compared with the control catalyst TEDA in the absence of a co-catalyst. The rate of isocyanate consumption as a function of time was measured using a formulation similar to that of Example 7, but containing monofunctional reactants. Reaction samples drawn at the indicated times were quenched with dibutylamine and analyzed by liquid chromatography. Catalysts were screened at different molar levels in order to compensate for activity differences. Initial isocyanate conversions ranged from 5 to 25%, allowing catalysts to be characterized based on activity. Table 3 summarizes the results.

TABLE 3

| Catalyst | mmole | % NCO Conversion | | | | | | |
| --- | --- | --- | --- | --- | --- | --- | --- | --- |
| | | 0.5 min | 1.0 min | 2.0 min | 3.0 min | 4.0 min | 6.0 min | 8.0 min |
| TEDA | 0.1556 | 14.2 | 28.9 | 50.3 | 64.1 | 71.6 | 79.9 | 83.6 |
| Example 1a | 0.1556 | 5.9 | 12.8 | 21.7 | 31.9 | 37.6 | 48.3 | 54.0 |
| Example 1b | 0.3112 | 25.4 | 44.7 | 63.3 | 70.7 | 74.5 | 78.1 | 81.8 |
| Example 1c | 0.3112 | 8.8 | 17.4 | 31.9 | 43.8 | 53.1 | 62.0 | 67.9 |
| Example 2 | 0.0778 | 14.7 | 28.2 | 45.1 | 56.8 | 63.7 | 71.2 | 75.5 |
| Example 3 | 0.0778 | 12.8 | 25.2 | 42.8 | 54.6 | 62.0 | 69.8 | 74.6 |
| Example 4 | 0.0778 | 16.5 | 31.4 | 48.3 | 59.3 | 66.5 | 73.9 | 77.9 |
| Example 5 | 0.0778 | 23.2 | 39.2 | 53.1 | 60.2 | 64.6 | 70.2 | 73.8 |
| Example 6 | 0.0778 | 20.2 | 37.9 | 56.5 | 66.0 | 71.5 | 77.0 | 80.9 |

The Table 3 data clearly show distinctions between various substituted pyrrolizidines which were not appreciated in the prior art. Example 1a and 1c catalysts were significantly less active than TEDA. Example 1a catalyst exhibited one half the activity of TEDA (as indicated by NCO conversion at 0.5 min); the initial NCO conversion for Example 1c catalyst was less than two thirds that for TEDA and the former was used at twice the molar level of the latter. Although synthesis of these materials was demonstrated in the prior art (see Examples 8 and 9 in CA 2,061,168 A), examples of the use of these materials as catalysts for polyurethanes were not given. Example 1b catalyst (the only pyrrolizidine to be evaluated as a polyurethane foam catalyst in CA 2,061,168 A) appeared to be about equivalent to TEDA in activity (it exhibited slightly less than twice the initial NCO conversion at twice the molar loading level). Surprisingly, Examples 2, 3 and 4 pyrrolizidines were roughly twice as active as TEDA (i.e., ½ molar use level required for approximate % NCO conversion match to TEDA). Examples 5 and 6 pyrrolizidines were more than twice as active as TEDA. The highly active pyrrolizidines (Examples 2–6 catalysts) were substituted with hydroxymethyl, aminomethyl or hydroxyl functionality. Less active materials (Examples 1a–1c catalysts) were pyrrolizidines substituted with electron withdrawing groups (e.g., nitrile and ester). Clearly, electron withdrawing groups on the pyrrolizidine skeleton are less desirable than hydroxy or amino containing substituents.

STATEMENT OF INDUSTRIAL APPLICATION

The present invention provides functionalized, bridged tertiary amine urethane catalysts for use in making polyurethane foams.

We claim:

1. In a method for catalyzing the trimerization reaction of a polyisocyanate or the reaction of a polyisocyanate with an active hydrogen containing compound, the improvement which comprises using a catalytically effective amount of a compound of the formula:

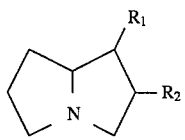

where $R_1$ and $R_2$ independently are —H, —OH,

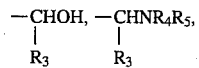

or —$NR_4R_5$, $R_3$ is hydrogen, a $C_1$–$C_{12}$ alkyl, $C_5$–$C_6$ cycloalkyl, $C_6$–$C_{10}$ aryl, or $C_7$–$C_{11}$ arylalkyl group, and $R_4$ and $R_5$ independently represent H, a $C_1$–$C_{12}$ alkyl group, $C_5$–$C_{10}$ cycloalkyl, $C_6$–$C_{10}$ aryl, or $C_7$–$C_{11}$ arylalkyl group, provided that at least one of $R_1$ and $R_2$ is not hydrogen.

2. The method of claim 1 in which one of $R_1$ and $R_2$ is —H and the other is —OH.

3. The method of claim 1 in which one of $R_1$ and $R_2$ is —H and the other is —$CH_2OH$.

4. The method of claim 1 in which one of $R_1$ and $R_2$ is —H and the other is —$NH_2$.

5. The method of claim 1 in which one of $R_1$ and $R_2$ is —H and the other is —$CH_2NH_2$.

6. The method of claim 1 in which one of $R_1$ and $R_2$ is —H and the other is —$CH_2NR_4R_5$, where $R_4$ and $R_5$ independently represent H or a $C_1$–$C_4$ alkyl group.

7. The method of claim 1 in which $R_3$ is hydrogen or a $C_1$–$C_4$ alkyl group, and $R_4$ and $R_5$ independently are hydrogen or a $C_1$–$C_4$ alkyl group.

8. The method of claim 7 in which $R_3$ is hydrogen.

9. The method of claim 8 in which $R_4$ is hydrogen and $R_5$ is a $C_1$–$C_4$ alkyl group.

10. The method of claim 8 in which $R_4$ and $R_5$ independently are $C_1$–$C_4$ alkyl groups.

11. In a method for preparing a polyurethane foam which comprises reacting an organic polyisocyanate and a polyol in the presence of a blowing agent, cell stabilizer and a catalyst composition, the improvement which comprises employing a catalyst composition consisting essentially of a compound of the formula:

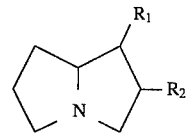

where $R_1$ and $R_2$ independently are —H, —OH,

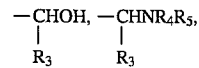

or —$NR_4R_5$, $R_3$ is hydrogen, a $C_1$–$C_{12}$ alkyl, $C_5$–$C_6$ cycloalkyl, $C_6$–$C_{10}$ aryl, or $C_7$–$C_{11}$ arylalkyl group, and $R_4$ and $R_5$ independently represent H, a $C_1$–$C_{12}$ alkyl group, $C_5$–$C_{10}$ cycloalkyl, $C_6$–$C_{10}$ aryl, or $C_7$–$C_{11}$ arylalkyl group, provided that at least one of $R_1$ and $R_2$ is not hydrogen.

12. The method of claim 11 in which the compound is 3- or 4-hydroxymethylpyrrolizidine or a mixture thereof.

13. The method of claim 11 in which the compound is 3- or 4-(N-isopropyl)aminomethylpyrrolizidine or a mixture thereof.

14. The method of claim 11 in which the compound is 4-hydroxymethylpyrrolizidine.

15. The method of claim 11 in which the compound is 4-hydroxypyrrolizidine.

16. The method of claim 11 in which the compound is 3- or 4-aminomethylpyrrolizidine or a mixture thereof.

17. The method of claim 11 in which $R_3$ is hydrogen or a $C_1$–$C_4$ alkyl group and $R_4$ and $R_5$ independently are hydrogen or a $C_1$–$C_4$ alkyl group.

18. The method of claim 17 in which $R_3$ is hydrogen.

19. The method of claim 18 in which $R_4$ is hydrogen and $R_5$ is a $C_1$–$C_4$ alkyl group.

20. The method of claim 18 in which $R_4$ and $R_5$ independently are $C_1$–$C_4$ alkyl groups.

* * * * *